United States Patent
Sato

(10) Patent No.: US 9,031,183 B2
(45) Date of Patent: May 12, 2015

(54) EMERGENCY CORE COOLING SYSTEM

(75) Inventor: Takashi Sato, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1374 days.

(21) Appl. No.: 12/115,777

(22) Filed: May 6, 2008

(65) Prior Publication Data

US 2008/0317193 A1 Dec. 25, 2008

(30) Foreign Application Priority Data

May 10, 2007 (JP) ................................. 2007-125567

(51) Int. Cl.
*G21C 9/00* (2006.01)
*G21D 3/04* (2006.01)
*G21C 15/18* (2006.01)

(52) U.S. Cl.
CPC ... *G21D 3/04* (2013.01); *G21C 15/18* (2013.01); *G21C 15/182* (2013.01); *G21Y 2002/201* (2013.01); *G21Y 2004/304* (2013.01); *Y02E 30/31* (2013.01)

(58) Field of Classification Search
CPC ........ G21D 3/04; G21C 15/18; G21C 15/182; G21Y 2002/201; G21Y 2004/304; Y02E 30/31
USPC .......................................................... 376/282
See application file for complete search history.

(56) References Cited

U.S. PATENT DOCUMENTS

| | | | |
|---|---|---|---|
| 2002/0101951 A1* | 8/2002 | Nakamaru et al. | 376/282 |
| 2005/0220259 A1* | 10/2005 | Sato et al. | 376/282 |
| 2007/0092053 A1 | 4/2007 | Sato | |

FOREIGN PATENT DOCUMENTS

| | | |
|---|---|---|
| JP | 57-067896 A | 4/1982 |
| JP | 08-248166 A | 9/1996 |
| JP | 11-030685 A | 2/1999 |
| JP | 2000-275380 A | 10/2000 |
| JP | 2005-201742 A | 7/2005 |
| JP | 2006-138680 A | 6/2006 |
| JP | 2007-010457 A | 1/2007 |

* cited by examiner

*Primary Examiner* — Frank J McGue
(74) *Attorney, Agent, or Firm* — Foley & Lardner LLP

(57) ABSTRACT

An emergency core cooling system is provided with a hybrid safety system composed of an active safety system and a static safety system for ensuring the safety against a severe natural phenomenon such as a giant earthquake and a mega hurricane. An emergency core cooling system for a boiling water reactor includes four safety divisions in total: three safety divisions for an active safety system having a high pressure reactor core cooling system, a low pressure reactor core cooling system, a residual heat removal system, and an emergency diesel generator; and one safety division for a static safety system having an isolation condenser, a gravity drop reactor core cooling system, and a static containment vessel cooling system.

9 Claims, 8 Drawing Sheets

US 9,031,183 B2

EMERGENCY CORE COOLING SYSTEM

BACKGROUND OF THE INVENTION

1. Field of the Invention

The present invention relates to an emergency core cooling system for a boiling water reactor.

2. Related Art

In a boiling water reactor (BWR), an emergency core cooling system (referred to an ECCS hereinafter) is provided.

The ECCS has space regions for safety design called safety divisions and is protected against anticipated fire, flooding, and so on in a plant, by isolating the safety divisions to each other with physical separations (fire walls and watertight walls) so as to isolate the influence of the anticipated events occurring in another division.

Generally speaking the ECCS has two to four safety divisions. In each division, a plurality of motor-driven systems are equipped, and electric power is supplied to the plurality of the motor-driven systems in the division from an emergency power supply source equipped in each safety division.

In the safety standards applied to the ECCS design, a single failure criterion called N+1 safety criterion is included.

During safety assessment on a loss of coolant accident (LOCA) that is a design basis accident (DBA), the N+1 safety criterion requires at least sufficient cooling of a core and a containment even when one system of the ECCS is disabled due to failure.

On the other hand, N+2 safety criterion requires sufficient cooling of the core and the containment even when two safety divisions are lost, by assuming not only a single failure but also maintenance during operation of the nuclear power plant (online maintenance).

The online maintenance is enabled by complying with the N+2 safety criterion, thereby largely contributing to the reduction in shutdown duration of the nuclear power plant and the safety improvement during the shutdown of the nuclear power plant.

An example of the ECCS in German BWR72 meeting the N+2 safety criterion will be described with reference to FIGS. 10 and 11.

FIG. 10 is a division diagram showing the ECCS configuration in German BWR72 meeting the N+2 safety criterion.

The ECCS, having three safety divisions, includes a high pressure core injection system (HPCI) 40a, a low pressure core injection system (LPCI) 41a, a residual heat removal system (RHR) 42a, and an emergency diesel generator (EDG) 43a for each safety division.

Since a pump and part of piping are shared with the low pressure core injection system 41a and the residual heat removal system 42a, they are indicated as LPCI41a/RHR42a in FIG. 10.

FIG. 11 is a drawing showing an ECCS configuration in one safety division. In each of the three safety divisions of FIG. 10, the same ECCS as that in the safety division of FIG. 11 is provided.

Water in a suppression pool 13 that is installed in a containment 15 serving as a water source is sucked and pressurized by pre-stage booster pump 45.

In the high pressure core injection system (HPCI) 40a, the pressurized water by the pre-stage booster pump 45 is further pressurized by an HPCI pump 46 and injected into a reactor pressure vessel 14.

In the low pressure core injection system (LPCI) 41a, the pressurized water by the pre-stage booster pump 45 is injected into the reactor pressure vessel 14 after being cooled in an RHR heat exchanger 47 and led to the feed water piping by an LPCI pump 48.

The German BWR72 is designed so that the number of safety divisions N required for a design basis accident is to be 1 and is composed of three safety divisions in total by adding two divisions thereto on the assumption that a single failure occurs and the online maintenance is performed.

Because each residual heat removal system 42a has 100% of the required heat removal capacity at the loss of coolant accident, which is the design basis accident, even if two safety divisions are lost due to a single failure and the online maintenance, respectively, the core and the containment can be cooled with the residual one safety division. That is the reason why the three safety division configuration can be adopted.

The German BWR72 has no reactor core isolation cooling system (RCIC) that is a turbine-driven system to maintain the core water level at transient. Therefore, if the nuclear reactor is isolated due to the loss of offsite power supply, and furthermore, if all the three emergency diesel generators 43a fail, i.e., an event of loss of the whole AC power supply source (referred to SBO below), occurs, the reactor core cannot be entirely cooled.

On the other hand, an example of the ECCS in Swedish BWR75 meeting the N+2 safety criterion will be described with reference to FIG. 12.

FIG. 12 is a division diagram showing the ECCS configuration in Swedish BWR75 meeting the N+2 safety criterion.

The ECCS, having four safety divisions, includes an auxiliary feed water system (AFS) 50b, a low pressure core injection system (LPCI) 41b or a low pressure core spray system (LPCS) 51b, a wet well and dry well cooling system (WDCS) 52b, and an emergency diesel generator (EDG) 43b for each safety division.

Since the residual heat removal system (RHR) is dedicatedly used as the wet well and dry well cooling system 52b for cooling a wet well and a dry well of the containment at a design basis accident, it is indicated as WDCS 52b in FIG. 12.

The low pressure core injection system 41b or the low pressure core spray system 51b and the residual heat removal system (the wet well and dry well cooling system) 52b are independently provided without sharing a pump unlike the LPCI pump 48 of the German BWR72.

The auxiliary feed water system (AFS) 50b is not provided for the purpose of the emergency core cooling, so that it does not have a sufficient capacity for cooling the core at the loss of coolant accident (LOCA) that is a design basis accident. Therefore, two systems of the AFS 50b in total are necessary to fulfill the injection to make up the coolant corresponding to the decay heat and the injection to make up the core at a small LOCA.

On the other hand, the low pressure core injection system (LPCI) 41b and the low pressure core spray system (LPCS) 51b have 100% of the cooling capacity per unit system required for cooling the reactor core at a piping breakage accident of the emergency core cooling system.

The wet well and dry well cooling system (WDCS) (the residual heat removal system) 52b is dedicated to cool the containment and does not have a function to inject water into the reactor core.

The Swedish BWR75 is designed so that the number of safety divisions N necessary for a design basis accident is 2 and is composed of four safety divisions in total by adding two divisions thereto on the assumption that a single failure occurs and the online maintenance is performed.

The reason why the four safety divisions are necessary is that if a combination of a single failure in the first safety division, online maintenance in the second safety division, and a loss of coolant accident in the third safety division due to a self-pipe break of the low pressure core injection system 41b or the low pressure core spray system 51b is assumed, it is realized that a fourth safety division having a function to inject water into the reactor core is required.

Further, on the basis of the above, a residual heat removal system 42b is designed to have 50% of the cooling capacity, per unit system, of the heat removal amount required for cooling the reactor core and the containment at the loss of coolant accident (LOCA), which is the design basis accident.

However, the Swedish BWR75 has no reactor core isolation cooling system (RCIC) in the same way as in the German BWR72. Hence, at the event of the loss of the whole AC power supply source (SBO), that is the reactor is isolated due to the loss of offsite power supply, and the entire four emergency diesel generators 43b are disabled due to common cause failure, the reactor core cannot be cooled.

Furthermore, as an improved version of the BWR, an advanced BWR (referred to ABWR hereinafter) is provided.

The ABWR enhances the safety performance of the ECCS much more than that of a conventional BWR while cost is minimized by dividing the ECCS into three divisions.

FIG. 13 is a diagram showing a division configuration of the ECCS in the ABWR.

Referring to FIG. 13, a low pressure core cooling system (LPFL) 61c, a residual heat removal system (RHR) 42c, and an emergency diesel generator (EDG) 43c are provided for each safety division. In the first and second safety divisions, a high pressure core cooling system (HPCF) 60c is provided, and at the third safety division, a reactor core isolation cooling system (RCIC) 62c is equipped.

Since a piping and a portion of a pump are shared with the low pressure core cooling system 61c and the residual heat removal system 42c, they are indicated as LPFL61c/RHR42c in FIG. 13.

The high pressure core cooling system (HPCF) 60c has a capacity sufficient for cooling the reactor core and avoiding the uncovery of the reactor core against entire range of loss of coolant accidents from the low pressure to the high pressure with one system. Hence, even on the assumption of a loss of coolant accident due to the self pipe break of the low pressure core cooling system 61c within the same safety division, the submergence of the reactor core can be maintained with only one system that is the high pressure reactor core cooling system 60c.

The residual heat removal system (RHR) 42c has 50% of the cooling capacity, per unit system, of the heat removal amount required for cooling the reactor core and the containment at the loss of coolant accident (LOCA), which is the design basis accident.

The reactor core isolation cooling system (RCIC) 62c is a turbine-driven pump system using the reactor steam supplied from the reactor vessel, so that an AC power source is not required. Therefore, even when the SBO occurs, the system is designed to sufficiently cool the reactor core. Further, the reactor core can be cooled for about 8 hours after the SBO occurs.

The ECCS of the ABWR has very high reliability and the full-time online maintenance is not necessary, so that the system is designed in compliance with the N+1 safety criterion on the assumption of only a single failure.

On the other hand, an ESBWR (economic and simplified BWR (referred to ESBWR hereinafter) is an example of having the ECCS composed of only passive safety systems (Japanese Unexamined Patent Application Publication No. 2007-10457, for example: Patent Publication 1).

FIG. 14 shows the ECCS configuration of the ESBWR.

The ECCS of the ESBWR shown in FIG. 14 includes an isolation condenser (IC) 65 placed on the containment 15 and composed of an upper cooling water pool and a heat exchanger placed thereon, a passive containment cooling system (PCCS) 67, and a gravity-driven cooling system (GDCS) 66 having a GDCS pool 68 arranged in the containment 15.

The isolation condenser (IC) 65 takes in the reactor steam directly from the reactor vessel 14 so as to again inject the condensate into the reactor vessel 14 by the gravity after cooling and condensing the steam by the heat exchanger. This is an equivalent function corresponding to the reactor core isolation cooling system (RCIC) 62c of the ABWR, and according to this function, the reactor core is cooled when the nuclear reactor is isolated.

The passive containment cooling system (PCCS) 67, at a loss of coolant accident, absorbs the steam discharged into the containment 15 so as to return the condensate to the GDCS pool 68 by the gravity after cooling the steam with the heat exchanger. This is a function corresponding to the residual heat removal system (RHR) 42c of the ABWR.

The gravity-driven cooling system (GDCS) 66, at a loss of coolant accident, injects cooling water in the GDCS pool 68 by the gravity for cooling the reactor core. This is a function corresponding to the low pressure core cooling system 61c of the ABWR.

Since the ECCS of the ESBWR is never using an active component, such as a motor-driven pump, a large-scale emergency power supply, such as an emergency diesel generator, is not at all required. Hence, the reactor core scarcely becomes damaged due to the long term SBO.

Further, since the ESBWR does not need an active secondary system, such as a reactor cooling water system (RCW) and a reactor sea water system (RSW), the ECCS cannot lose the function due to the damage of the active component and have high safety.

On the other hand, in the ESBWR using the gravity to inject water into the reactor core sufficiently, it has been necessary to provide a very long reactor pressure vessel 14 with a height as tall as 27.6 m.

As an example of the ECCS totally ensuring the safety of a nuclear power plant, not by relying only on the passive component like in the ESBWR but by optimally combining the active safety system of the ABWR with the passive safety system of the ESBWR, there is provided a hybrid 3-division ECCS of a TSBWR (Japanese Unexamined Patent Application Publication No. 2006-138680, for example: Patent Publication 2).

FIG. 15 is a diagram showing a division configuration of the ECCS in the TSBWR.

Referring to FIG. 15, in each of first and second safety divisions, an ECCS of an active safety system is provided so as to provide a high pressure core cooling system (HPCF) 60d, a low pressure core cooling system (LPFL) 61d, a residual heat removal system (RHR) 42d, and an emergency diesel generator (EDG) 43d, respectively. Since a pump and a portion of a piping are shared with the low pressure-core cooling system 61d and the residual heat removal system 42d, they are indicated as LPFL61d/RHR42d in FIG. 15.

In a third safety division, an isolation condenser (IC) 65d, a gravity-driven cooling system (GDCS) 66d, and a passive containment cooling system (PCCS) 67d are provided as a passive safety system.

Each ECCS of the TSBWR in the first and second safety divisions has 100% of the cooling capacity required for cooling the reactor core at a loss of coolant accident that is a design basis accident. Namely, the active safety system is designed so as to satisfy the N+1 safety criterion alone.

However, since the ECCS in the third safety division also has 100% of the cooling capacity required for cooling the nuclear reactor core at a loss of coolant accident that is a design basis accident, the whole ECCS is designed to satisfy the N+2 safety criterion.

Thus, even when the entire functions of the safety divisions for the active safety system are lost, the ECCS of the TSBWR can safely cool the reactor core and the containment with the safety division for the=passive safety system that is quite diverse from the active safety system in the operating mechanism.

A conventional BWR, as typified by the ABWR, has extremely high safety against an internal event generated within a nuclear power plant, and the reactor core damage frequency due to the internal event is as very small as the order of $10^{-8}$/reactor•year.

For the extremely safe BWR as described above, an external event is only one residual risk (although the risk level has been already lowered thoroughly and the safety level is sufficiently high in view of engineering, too few risk but it is not reduced to the extent of substantial zero).

The external event herein includes severe natural phenomena such as a giant earthquake and a mega hurricane. It also includes a fire originated not by an event within a nuclear power plant but by an external cause.

In the conventional BWR and ABWR having the ECCS composed only of the active safety system, when a severe natural phenomenon, such as a giant earthquake and a mega hurricane, is generated, the loss of the whole AC power supply event (SBO) continues a long time, so that the reactor core may be damaged.

Specifically, the German BWR72 and the Swedish BWR75 have no reactor core isolation cooling system (RCIC), so that they are designed so as never to cool the reactor core at the SBO.

In the German BWR72, due to the failure of the pre-stage booster pump 45 provided in each safety division, there is the possibility that whole function of one safety division can be lost. Furthermore, since the number of the safety divisions is 3, on the assumption that a fire is generated in a first safety division; a single failure occurs in a second safety division; and the online maintenance is performed in a third safety division, no available safety division exists.

Furthermore, in the Swedish BWR75, since the four residual heat removal systems (the four wet well and dry well cooling systems) 52b are provided in all the safety divisions, the four reactor cooling water systems (RCW) and the four reactor sea water systems (RSW), which are required as a secondary cooling system) are also provided in the four safety divisions, deteriorating the cost efficiency. Further, the four emergency power supply units are provided, increasing the maintenance load.

On the other hand, in the ABWR designed in compliance with the N+1 safety criterion, the maintenance of the ECCS is necessary to be performed during the shutdown of a nuclear power plant, so that the number of the safety divisions may be less against a natural phenomenon generated during this period, which may result in a risk of the reactor core damage due to insufficient cooling of the reactor core.

When the N+2 safety criterion is required, on the assumption that the safety function is lost due to a fire in a first safety division and second and third safety divisions are not available due to a single failure and the online maintenance, respectively, upon being required to shutdown a nuclear power plant due to an external fire that is an external event, there is no residual functioning safety division so that the nuclear reactor cannot be safely shutdown.

When the SBO is generated, although the cooling of the reactor core is possible for about 8 hours by the reactor core isolation cooling system, if the SBO continues for a longer period, the reactor core might not be cooled.

In the ESBWR having the ECCS composed of only the passive safety system, since its operation does not require an external power supply system, an emergency power supply, and a RCW, if a severe natural phenomenon is generated, the high safety has been secured owing to the passive safety system.

However, during the refueling of the nuclear power plant, since the reactor pressure vessel 14 and the containment 15 are opened, almost all the passive safety systems are not available due to the loss of the steam buoyancy and the pressure difference in the containment 15 serving as driving force.

Thus, against a natural phenomenon generated during the refueling of the nuclear power plant, there is little effective safety equipment, deteriorating the safety.

Furthermore, although the ESBWR is provided with a shutdown cooling system (SCS) (not shown) for removing the residual heat from the reactor core during the refueling of the nuclear power plant, the shutdown cooling system could not respond to a natural phenomenon because it is a non-safety system.

In addition, in the TSBWR having the ECCS composed of the active safety system and the passive safety system, during the operation of the nuclear power plant, extremely high safety can be secured against the natural phenomenon owing to the passive safety system.

However, since the TSBWR only has the number of the safety divisions for the active safety system to a required minimum, during the shutdown of the nuclear power plant where the passive safety system is not available, the number of the safety divisions of the active safety system is insufficient, so that if a natural phenomenon is generated, the reactor core might be damaged.

Furthermore, for relying on the function of the gravity-driven cooling system 66d, a long reactor pressure vessel with a large height has been required. Unless it is provided, the online maintenance is impossible because of the insufficient cooling function of the gravity-driven cooling system 66d.

In addition, since the number of the safety divisions is 3, on the assumption that a single failure is generated, i.e., the emergency diesel generator 43d is failed in a first safety division; the online maintenance of the emergency diesel generator 43d is performed in a second safety division; and a fire is generated in a third safety division, there is no residual functioning safety division for safely shutdown the nuclear reactor.

SUMMARY OF THE INVENTION

The present invention has been made in view of the situations described above, and an object of the present invention is to provide an emergency core cooling system having such high safety that it makes the risk of natural phenomena, which may contribute mostly to the only one residual risk among external events, to be substantially zero, and also having the sufficient number of safety divisions against an external fire, by further improving a BWR that has already established extremely high safety against internal events.

In order to achieve the above and other objects, the present invention provides an emergency core cooling system pro vided for a boiling water reactor power plant, which comprises:

3 safety divisions for an active safety system which mets the N+2 safety criterion; and at least one safety division for a passive safety system cooling the reactor core for a predetermined period of time.

In a preferred embodiment, each of the 3 safety divisions for the active safety system is provided with a high pressure core cooling system having enough capacity for 100% of the injection function required for cooling the reactor core at the design basis accident, a low pressure core cooling system having enough capacity for 100% of the injection function required for cooling the reactor core at the design basis accident, a residual heat removal system having enough capacity for 100% of the removing heat capacity required for cooling the reactor core and a containment at the design basis accident, and an emergency power supply source for feeding electric power to the high pressure core cooling system, the low pressure core cooling system, and the residual heat removal system, and also desired that the number of safety divisions for the passive safety system is 1, and the safety division for the passive safety system is provided with an isolation condenser.

In the above aspect, the emergency power supply source provided in each of the safety divisions for the active safety system may include at least one of a diesel generator and a gas turbine generator.

The isolation condenser provided in the safety division for the passive safety system may hold cooling water enough for cooling the reactor core for at least 8 hours.

The safety division for the passive safety system may further include a passive containment cooling system, and a gravity-driven cooling system.

The low pressure core cooling system provided in each of the safety divisions for the active safety system may further include a containment=spray system for spraying cooling water into the containment.

The residual heat removal system provided in each of the safety divisions for the active safety system may include a containment=spray system for spraying cooling water into the nuclear reactor containment.

The nature and further characteristic features of the present invention will be made clearer from the following descriptions made with reference to the accompanying drawings.

DESCRIPTION OF THE PREFERRED EMBODIMENTS

The present invention will be described hereunder with reference to preferred embodiments represented by the accompanying drawings.

[First Embodiment]

Figure 1:
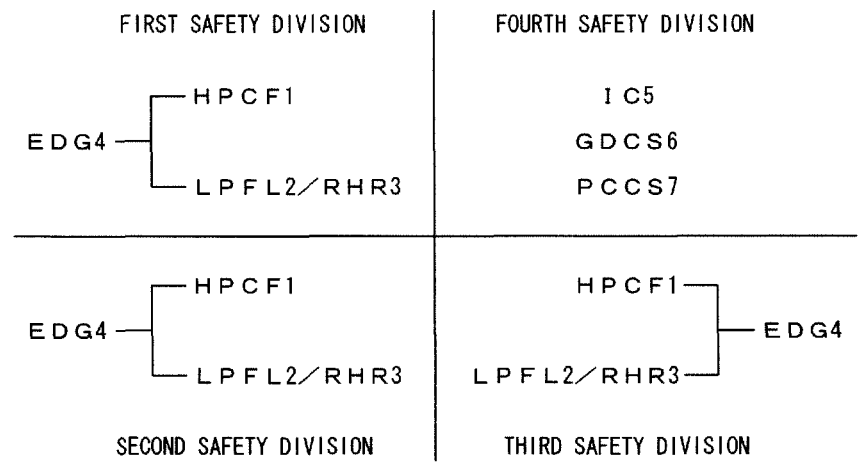
FIG. 1 is a division diagram showing an emergency core cooling system according to a first embodiment of the present invention.

FIG. 1 is a division diagram showing an emergency core cooling system (ECCS) incorporated in a boiling water reactor nuclear plant (BWR), according to a first embodiment of the present invention.

The number of safety divisions of the ECCS for the BWR according to this embodiment of the present invention is four, for example.

In each of first to third safety divisions, a high pressure core cooling system (HPCF) 1, a low pressure core cooling system (LPFL) 2, a residual heat removal system (RHR) 3, and an emergency diesel generator (EDG) 4 are provided as active safety systems. Since a portion of a piping and a pump are shared with the low pressure core cooling system 2 and the residual heat removal system 3, they are indicated as LPFL2/RHR3 in FIG. 1.

In a fourth safety division, an isolation condenser (IC) 5, a gravity-driven cooling system (GDCS) 6, and a passive containment cooling system (PCCS) 7 are provided as passive safety systems.

In the high pressure core cooling system (HPCF) 1 as a active safety system, the cooling water in a water source is sucked with a high delivery-pressure motor-driven pump and piping so as to be injected into a nuclear reactor under a pressure ranging from about 75 atm to a low pressure of 10 atm or less via injection piping and an injection valve.

The water source may include a suppression pool 13 and a condensate reservoir (not shown).

In the low pressure core cooling system (LPFL) 2, the cooling water in the water source is sucked by a motor-driven pump so as to be injected into the nuclear reactor under about 10 atm or less via injection piping and an injection valve.

The residual heat removal system 3 is a system for removing the residual heat during the normal shutdown or the isolation of the nuclear reactor and also has the reactor core cooling function at a loss of coolant accident.

The residual heat removal system 3 in each safety division has enough capacity for 100% of removing heat capacity (twice the removing heat capacity of the residual heat removal system of a conventional ABWR) required for cooling the nuclear reactor core and the containment 15 at a loss of coolant accident, which is a design basis accident.

The high pressure core cooling system 1 and the low pressure core cooling system 2 in each safety division have enough capacity for 100% injection capacity required for cooling the nuclear reactor core, respectively, at a loss of coolant accident, which is a design basis accident. Thus, the reactor core can be cooled by driving one single system in the high pressure core cooling system 1 and the low pressure core cooling system 2.

The emergency diesel generator (EDG) 4 is automatically started as backup even at a loss of a normal AC power supply due to the interruption so as to supply emergency electricity to active components such as pumps of the high pressure core cooling system 1, the low pressure core cooling system 2, and the residual heat removal system 3. The emergency diesel generator 4 has enough capacity for 100% capacity of the required power supply for one safety division per unit generator.

The isolation condenser (IC) 5 that is a passive safety system in a fourth safety division directly takes in the steam of the nuclear reactor with suction piping so as to cool the steam by leading it to an isolation condenser heat exchanger (not shown). The cooled steam is wholly condensed to return to the nuclear reactor by the gravity via piping.

The isolation condenser 5 is a passive safety cooling apparatus absolutely requiring no AC power supply for operation, so that the ECCS having the isolation condenser 5 can ensure high hybrid safety by adding active safety systems in the three safety divisions thereto. The isolation condenser 5 has a large capacity cooling water source (1500 m$^3$, for example), so as to remove the decay heat for a predetermined period of time, at least for 8 hours (about 2 or 3 days in practice).

When the ECCS is applied to the BWR of Class 1200 MWe, the reactor core can be cooled for about 3 days, and when the ECCS is applied to the BWR of Class 1800 MWe, for about 2 days. If the capacity of the cooling water is increased, the reactor core can be cooled for 3 days or more.

The gravity-driven cooling system (GDCS) 6 floods and cools the core debris dropped on the bottom of the containment=15 even if an ex-vessel core melt occurs.

This purpose is different from that of the gravity-driven cooling system 6 of a conventional TSBWR, which is provided for mainly cooling the reactor core.

Since the gravity-driven cooling system 6 requires no electric power and no active auxiliary systems such as RCW and RSW, even if the long term SBO is generated due to a severe natural phenomenon, such as a giant earthquake, and further the reactor core damage is resulted due to a loss of the function of the isolation condenser 5, the core debris can be flooded and cooled.

During the cooling of the flooded core debris, the steam corresponding to the decay heat is generated, and the steam is sucked into the passive containment cooling system (PCCS) 7 due to its own pressure. Thereafter, the steam is cooled and condensed, and then, the condensate drains into a GDCS pool (not shown) due to the gravity. Thus, the condensed water can be again used for cooling the core debris as the cooling water of the gravity-driven cooling system 6.

The passive containment cooling system (PCCS) 7 has a function to suck the steam discharged into the containment 15 at a loss of coolant accident so as to return the condensed water to the GDS pool (not shown) by the gravity after the steam is cooled in the heat exchanger.

The passive containment cooling system 7 is composed of only passive safety components and absolutely requires no power. Furthermore, it does never require the cooling of the secondary side with an active safety component such as RCW and RSW.

Therefore, the passive containment cooling system 7 can cool the containment 15 even if a severe natural phenomenon, such as a giant earthquake, is generated. Even if apparatus, such as an off-site power supply, an emergency power supply and RCW and RSW, are damaged, the containment 15 can be cooled. Thus, the high safety can be ensured without discharging a large amount of the radioactive substance generated in the reactor core into the atmosphere.

The fourth safety division having such a passive safety system has the cooling capacity required for independently cooling the reactor core for at least 8 hours.

Figure 2:
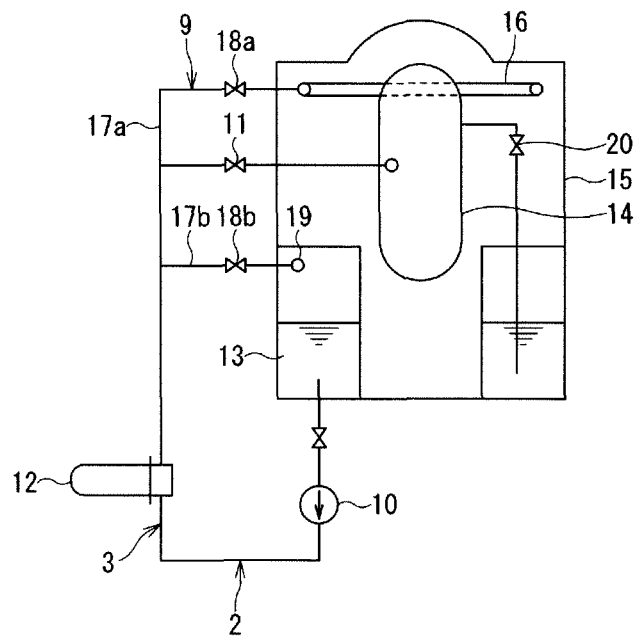
FIG. 2 is a drawing showing a configuration of the emergency core cooling system according to the first embodiment of the present invention.

FIG. 2 shows configurations of the low pressure core cooling system 2 and the residual heat removal system 3 in the BWR. In each of the first to third safety divisions of FIG. 1, the low pressure core cooling system 2 and the residual heat removal system 3 shown in FIG. 2 are provided.

The low pressure core cooling system 2, which has been composed of two systems to fulfill their total function in a conventional ABWR, is now composed of only one system by increasing the pump capacity of an LPFL pump 10. The one system of the low pressure core cooling system 2 can be simultaneously used as a containment spray system 9 and a core cooling system.

At a loss of coolant accident, the low pressure core cooling system 2 automatically starts the LPFL pump 10 and further automatically opens an injection valve 11.

On the downstream side of the LPFL pump 10, an RHR heat exchanger 12 is provided for cooling the water sucked from the suppression pool 13. The water is then injected into the reactor pressure vessel 14 to cool the core. The LPFL pump 10 has functions to inject cooling water into the reactor pressure vessel 14 as the low pressure core cooling system 2 and to simultaneously spray cooling water into the containment 15 as the containment spray system 9.

According to the embodiment, the low pressure core cooling system 2 includes a branch line 17*a* and a motor-operated valve 18*a* placed on the branch line 17*a*, which are connected to a dry well spray header 16 for use in the containment spray system 9 for spraying a dry well.

The low pressure core cooling system 2 also includes a branch line 17*b* and a motor-operated valve 18*b* placed on the branch line 17*b*, which are connected to a wet well spray nozzle 19 for spraying a wet well.

The containment spray system 9 injects water into the containment vessel 15 by manually or automatically opening the motor-operated valves 18*a* and 18*b* after the water level of the reactor pressure vessel 14 is secured by the low pressure core cooling system 2, after 30 minutes since the generation of a loss of coolant accident, for example.

A motor-operated relief valve 20 is provided for securing the complete depressurization of the reactor pressure vessel 14. Therefore, the pressures of the reactor pressure vessel 14 and the containment 15 can be equalized in the long-term at a loss of coolant accident.

Furthermore, even when cooling water is injected into the reactor pressure vessel 14 simultaneously with the spaying in the containment with the one system of the low pressure core cooling system 2, since the pressure of the reactor pressure vessel 14 can be maintained low, there can be avoided a problem such that the cooling water is disproportionally sprayed only in the containment 15 without being injected into the reactor pressure vessel 14.

The ECCS according to the first embodiment can satisfy the N+2 safety criterion with only three safety divisions of the active safety systems.

This is because the high pressure core cooling system 1 and the low pressure core cooling system 2 in one safety division have enough capacity for 100% of the injection capacity required for cooling the nuclear reactor core, respectively, at a loss of coolant accident that is a design basis accident. Furthermore, the residual heat removal system 3 has enough capacity for 100% of the heat removal amount required at a loss of coolant accident, which is a design basis accident. Therefore, the safety can be improved with three safety divisions of the active safety systems.

Coping examples or measures of the ECCS according to the embodiment at a loss of coolant accident, which is a design basis accident or at an accident due to an external event will be described below.

As a first example of the loss of coolant accident that is a design basis accident, it is assumed that an accident of injection pipe break of the high pressure core cooling system 1 is generated in the first safety division; a single failure of the emergency diesel generator 4 is generated in the second safety division; the online maintenance of the emergency diesel generator 4 is performed in the third safety division; and furthermore the offsite power supply is lost.

In this case, the low pressure core cooling system 2/the residual heat removal system 3 and the emergency diesel generator 4 in the first safety division can be operated. Hence, 100% of the injection capacity required for cooling the reactor core and 100% of the heat removal amount required for cooling the reactor core and the containment vessel 15 can be ensured. Therefore, the N+2 safety criterion can be satisfied.

As a second example, it is assumed that the function of the ECCS is lost in the first safety division due to an external fire; a single failure of the emergency diesel generator 4 is generated in the second safety division; and the online maintenance of the emergency diesel generator 4 is performed in the third safety division.

In this case, the reactor core cooling can be continued for a long time with the isolation condenser 5 that is a passive safety system in the fourth safety division, so that in this duration, the recovery of the emergency diesel generators 4 in the second and third safety divisions and the recovery of the offsite power supply can be expected. Therefore, the N+2 safety criterion also can be satisfied.

Furthermore, when safety relief valve is assumed to be stuck open while the reactor is hot standby with the isolation condenser 5 operating that is a passive safety system in the fourth safety division, the integrity of the containment=15 can be maintained by the passive containment cooling system 7.

On the other hand, as a third example, it is assumed that an offsite power supply is lost due to a severe natural phenomenon, such as a giant earthquake or a mega hurricane; and the SBO is generated due to failure of the emergency diesel generators 4 in the first to third safety divisions.

The isolation condenser 5 that is a passive safety system arranged in the fourth safety division has the capacity of cooling water capable of independently cooling the reactor core for a predetermined period of time, at least for 8 hours (about 2 or 3 days in practice). Hence, by the isolation condenser 5, the reactor core cooling can be continued for a long time.

Further, in this duration, the recovery of the emergency diesel generator 4 that is a active safety system and the recovery of the offsite power supply can be expected.

If the isolation condenser 5 is designed so that the duration time for cooling the reactor core is less than 8 hours, that is a predetermined time, at 4 hours, for example, the recovery possibility of the emergency diesel generator 4 that is a active safety system and the recovery possibility of the offsite power supply are largely reduced, so that the reliability is difficult to be secured sufficiently for the hybrid safety system.

In an old-fashioned BWR plant, an emergency condenser has been used so that the cooling duration time is short such as 4 hours and heat transfer piping is led to a small cooling water tank.

On the other hand, the isolation condenser 5 according to the embodiment incorporates the same system as that of the ESBWR composed of only the passive safety systems, and it is different from a conventional emergency condenser in respect that a large cooling water pool is directly placed on the containment 15 for holding a large amount of cooling water.

According to the embodiment, the active safety system includes the low pressure core cooling system 2. However, it may be replaced with other low pressure ECCS such as a low pressure core injection system (LPCI) and a low pressure core spray system (LPCS). Similarly, the high pressure reactor core cooling system 1 may be replaced with other high pressure ECCS.

Figure 3:
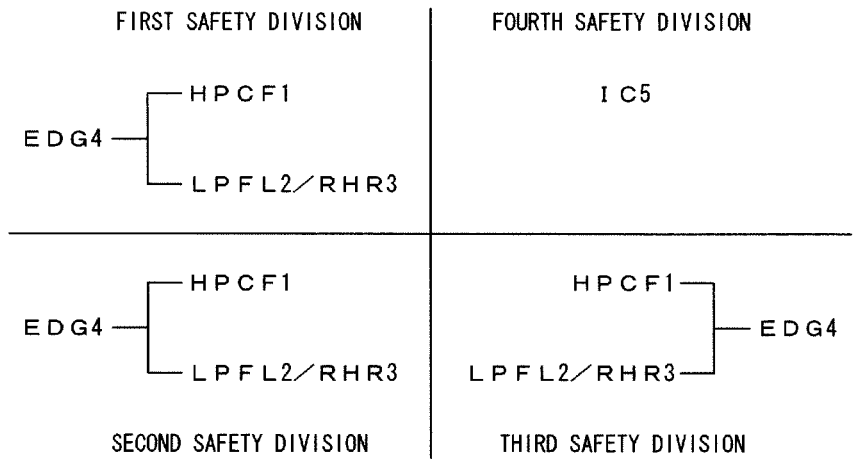
FIG. 3 is a division diagram showing an emergency core cooling system according to a modification of the first embodiment of the present invention.

Further, although the passive safety system includes the isolation condenser 5, the gravity-driven cooling system 6, and the passive containment cooling system 7, the isolation condenser 5 may also be only provided as shown in FIG. 3.

Figure 4:
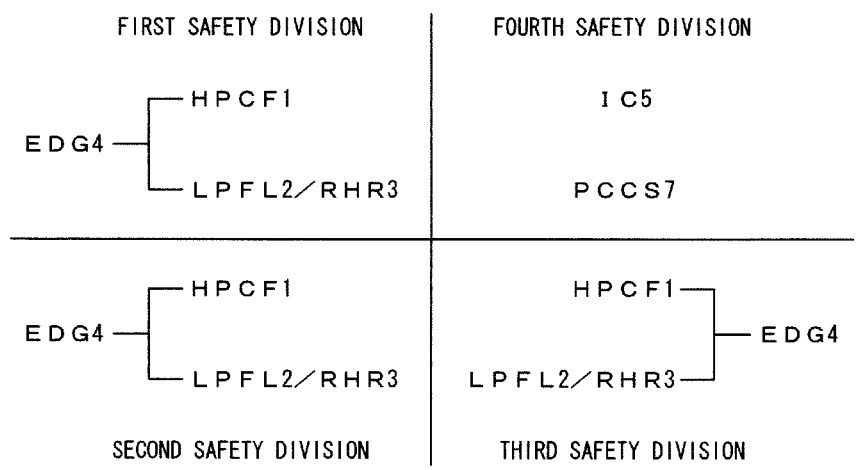
FIG. 4 is a division diagram showing an emergency core cooling system according to another modification of the first embodiment of the present invention.

Furthermore, as shown in FIG. 4, the passive safety system may also include the isolation condenser 5 and the passive containment cooling system 7.

The emergency diesel generator 4 of the active safety system has 100% of the required power supply for one safety division per unit generator, and alternatively, two small emergency diesel generators or more may be provided to have diversity, each of which has 50% of the required power supply for one safety division per unit generator. When the three emergency diesel generators are provided, one generator may be a spare machine, According to the embodiment, although the number of the safety divisions for the active safety system is 3 and the number of the safety divisions for the passive safety system is 1, as long as the design is capable of improving the safety to have the diversity against a loss of coolant accident that is a design basis failure and an external event, the safety division composed of the three or more safety systems in conformity with the N+2 safety criterion and the safety division composed of one or more passive safety system may be provided.

According to the embodiment, with the ECCS in one safety division for the active safety system, the high pressure core cooling system 1 or the low pressure core cooling system 2 can have 100% of the cooling capacity required for cooling the reactor core and the residual heat removal system 3 can have 100% of the heat removal amount required for cooling the reactor core and the containment=15, so that the N+2 safety criterion can be satisfied by the three safety divisions for the active safety system.

Furthermore, according to the embodiment, since the ECCS is composed of the three safety divisions for the active safety system, which satisfy the N+2 safety criterion by themselves and the one safety division for the passive safety system, a risk resulting in the reactor core damage due to a severe natural phenomenon can be extremely reduced.

Since the ECCS according to the embodiment satisfies the N+2 safety criterion, the online maintenance can be performed during the operation of a nuclear reactor power plant. Hence, during shutdown of the reactor power plant, the active safety systems in all the safety divisions can be maintained on standby, so that even if a severe natural phenomenon, such as a giant earthquake or a mega hurricane, is generated, a risk resulting in the reactor core damage can be extremely reduced.

Furthermore, the safety during shutdown of the reactor power plant, the probabilistic safety assessment during the shutdown, and the probabilistic safety assessment against an earthquake during the shutdown (that are the overall safety assessment by the combination of initiating events, unreliability of individual systems, and the failure probability of components) can be largely improved.

Furthermore, by increasing the pump capacity of the LPFL pump 10, the low pressure core cooling system 2, which has been composed of two systems in a conventional ABWR, is composed of only one system, and the one system of the low pressure core cooling system 2 can be simultaneously used as the containment spray system 9 and the core cooling system.

On the other hand, when the gravity-driven cooling system 6 is provided as a passive safety system, in a conventional ESBWR, a tall and long reactor pressure vessel has been provided, whereas, in the ECSS according to the present invention, the submergence of the reactor core can be maintained by elongating the overall length of the reactor pressure vessel 14 by about 2 m.

Figure 5:
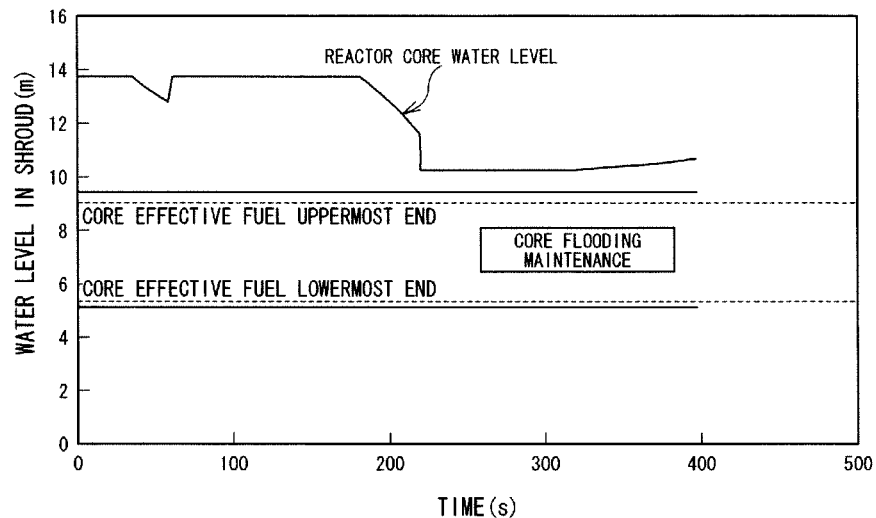
FIG. 5 is a graph showing analysis results of water level changes within the nuclear reactor at a loss of coolant accident that is a design basis accident in the emergency core cooling system according to the present invention.

FIG. 5 shows analysis results of water level changes in the reactor core at a loss of coolant accident that is a design basis accident when the overall length of the reactor pressure vessel 14 is elongated by about 2 m longer than that of the reactor pressure vessel of the ABWR.

The analysis condition is that at a piping breakage accident generated in the high pressure core cooling system 1, water is injected with only one system of the low pressure core cooling system 2.

From FIG. 5, it is confirmed that the submergence of the reactor core can be maintained by injecting water into the reactor core with only one system of the low pressure core cooling system 2 due to the enhancing the inherent safety that an internally possessed water quantity is increased by elongating the overall length of the reactor pressure vessel 14 by about 2 m.

[Second Embodiment]

An emergency core cooling system (ECCS) according to a second embodiment of the present invention will be described hereunder with reference to FIG. 6. Upon describing the ECCS according to the second embodiment, like reference characters designate like components common to the ECCS according to the first embodiment, and the duplicated description is omitted herein.

Figure 6:
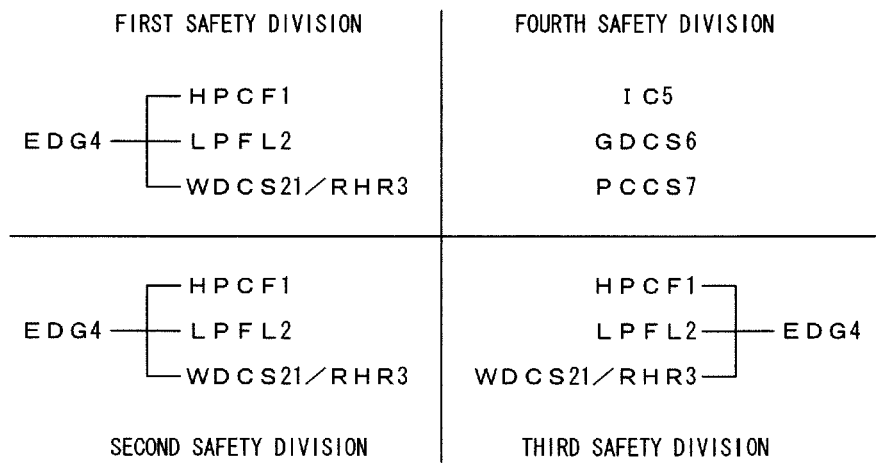
FIG. 6 is a division diagram showing an emergency core cooling system according to a second embodiment of the present invention.

FIG. 6 is a division diagram showing the ECCS incorporated in a BWR.

The number of safety divisions for the ECCS of the BWR according to the second embodiment is 4, for example.

In each of first to third safety divisions, the high pressure core cooling system (HPCF) 1, the low pressure core cooling system (LPFL) 2, the residual heat removal system (RHR) 3, a wet well and dry well cooling system (WDCS) 21, and the emergency diesel generator (EDG) 4 are provided as active safety systems.

Since a portion of a piping and a pump are shared with the residual heat removal system 3 and the wet well and dry well cooling system 21, they are indicated as WDCS21/RHR3 in FIG. 6.

The passive safety system in a fourth safety division is the same as that according to the first embodiment, so that the description is omitted herein.

The point of the ECCS of the BWR according to the second embodiment different from that of the first embodiment resides in that the low pressure core cooling system 2 is completely independently provided from the residual heat removal system 3/the wet well and dry well cooling system 21.

Thereby, the reliability of cooling the containment by the active safety apparatus can be improved.

Figure 7:
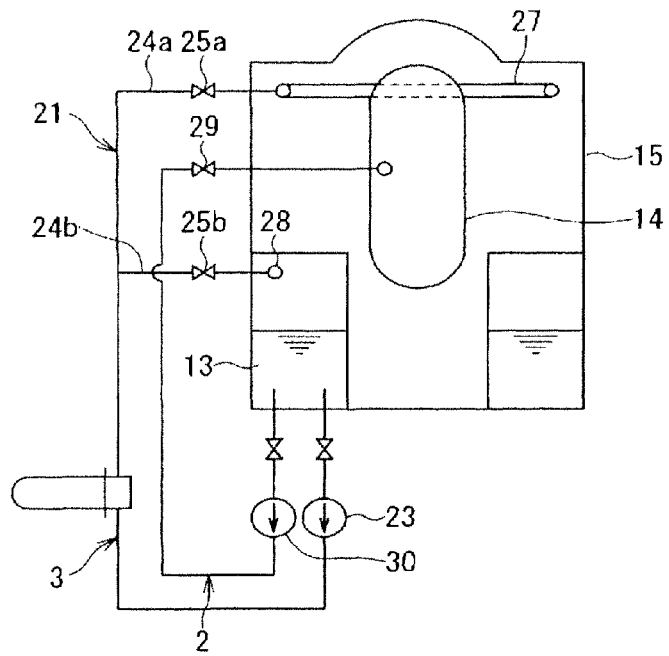
FIG. 7 is a drawing showing a configuration of the emergency core cooling system according to the second embodiment of the present invention.

FIG. 7 shows configurations of the low pressure core cooling system 2 and the residual heat removal system 3/the wet well and dry well cooling system (WDCS) 21 according to the second embodiment. In each of the first to third safety divisions shown in FIG. 6, the low pressure core cooling system 2 and the residual heat removal system 3/the wet well and dry well cooling system 21 are provided with the same configurations as those shown in FIG. 7.

At a loss of coolant accident that is a design basis accident, the low pressure core cooling system (LPFL) 2 automatically starts an LPFL pump 30 and further automatically opens an injection valve 29 for injecting the water of the suppression pool 13 into the reactor pressure vessel 14.

On the other hand, the residual heat removal system (RHR) 3 functions as the wet well and dry well cooling system 21 that sprays cooling water into the containment 15 using an RHR pump 23.

The residual heat removal system 3 includes a branch line 24*a* and a motor-operated valve 25*a* placed on the branch line 24*a*, which are connected to a dry well spray header 27, for use as the wet well and dry well cooling system 21.

The residual heat removal system 3 also includes a branch line 24*b* and a motor-operated valve 25*b* placed on the branch line 24*b*, which are connected to a wet well spray nozzle 28 for spraying a wet well.

According to this embodiment, by additionally providing the RHR pump 23, the independence is ensured between the reactor-core cooling and the containment cooling by the active safety systems at a loss of coolant accident that is a design basis accident, thus improving the reliability.

Even if a severe natural phenomenon, such as a giant earthquake or a mega hurricane, is generated, a risk resulting in the reactor core damage can be extremely reduced.

[Third Embodiment]

An ECCS according to a third embodiment of the present invention will be described with reference to FIG. 8.

Upon describing the ECCS according to the third embodiment, like reference characters designate like components common to the ECCS according to the first embodiment, and the description is omitted.

Figure 8:
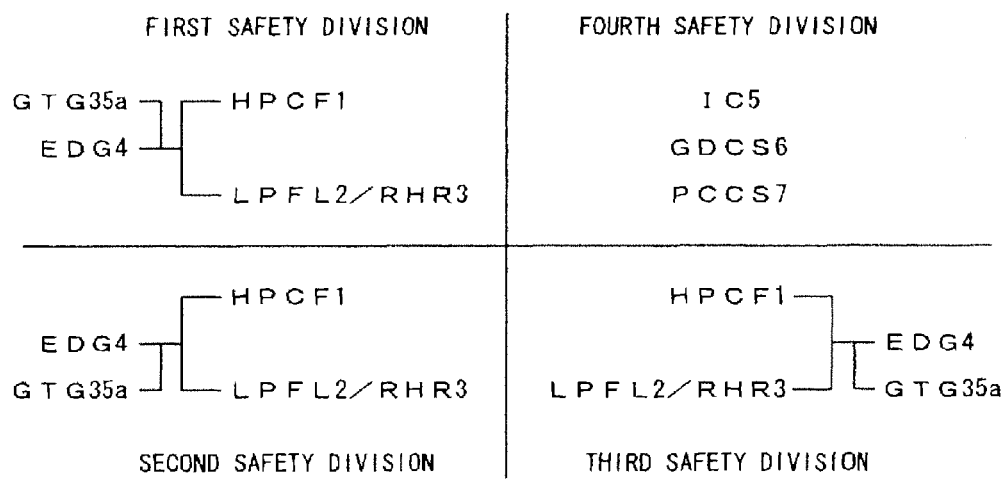
FIG. 8 is a division diagram showing an emergency core cooling system according to a third embodiment of the present invention.

FIG. 8 is a diagram showing a division of the ECCS incorporated in a BWR.

An emergency power supply is an important apparatus, at a loss of the offsite power supply system, which supplies the power necessary for safely shutdown the nuclear reactor while supplying the power necessary for operating engineering safety facilities.

Generally, one emergency power supply is provided in each of safety divisions. The safety is assessed on the assumption that the failure of the emergency power supply is to be a single failure. Hence, it is required to assume that the entire functions of the active safety systems in one safety division are lost by the single failure of the emergency power supply.

Therefore, the design having both the diversity and the independence is demanded in order not to completely lose the power supply even in consideration of the single failure of the emergency power supply at a loss of the offsite power supply.

In coping with the above matter, in the ECCS according to the third embodiment, in addition to the emergency diesel generator 4 as the emergency power supply according to the first embodiment, a gas turbine generator (GTG) 35*a* is further added as an auxiliary power supply.

The gas turbine generator 35*a* requires no cooling water system, so that the reliability can be improved rather than the case where the emergency diesel generators 4 are only provided.

According to the third embodiment, although the emergency diesel generator 4 and the gas turbine generator 35*a* are provided, only the gas turbine generator 35*a* may be provided.

According to this embodiment, the diversity of the emergency power supply can be ensured, further improving the safety of the ECCS.

Even if a severe natural phenomenon, such as a giant earthquake or a mega hurricane, is generated, a risk resulting in the reactor core damage can be extremely reduced.

[Fourth Embodiment]

An ECCS according to a fourth embodiment of the present invention will be described hereunder with reference to FIG. 9.

Upon describing the ECCS according to the fourth embodiment, like reference characters designate like components common to the ECCS according to the third embodiment, and the description is omitted herein.

Figure 9:
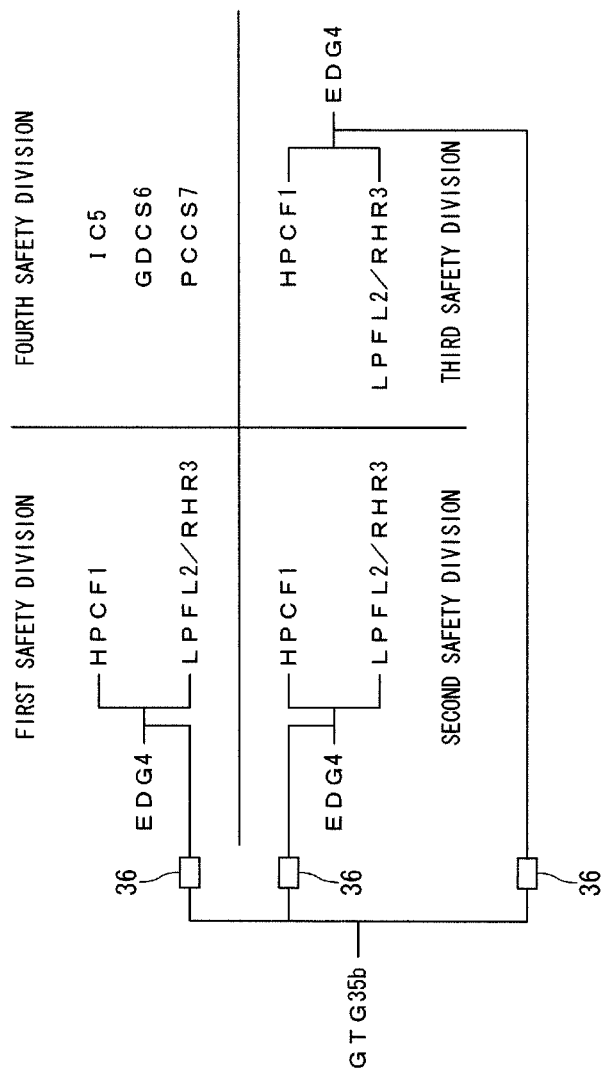
FIG. 9 is a division diagram showing an emergency core cooling system according to a fourth embodiment of the present invention.
Figure 10:
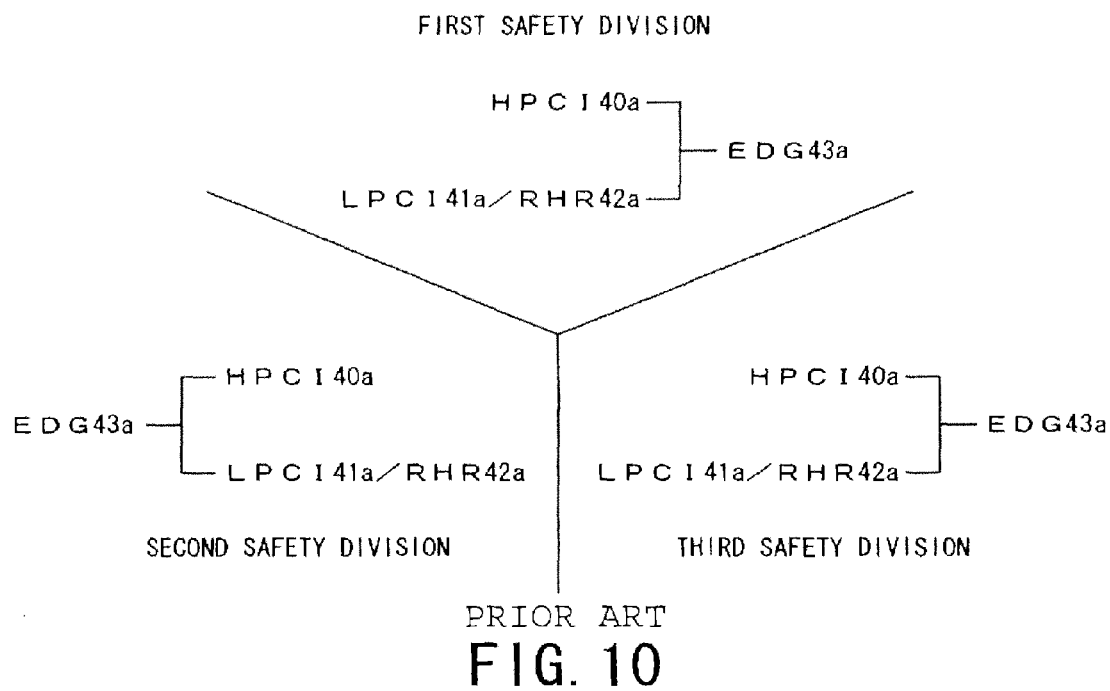
FIG. 10 is a division diagram showing an emergency core cooling system of a conventional BWR72.
Figure 11:
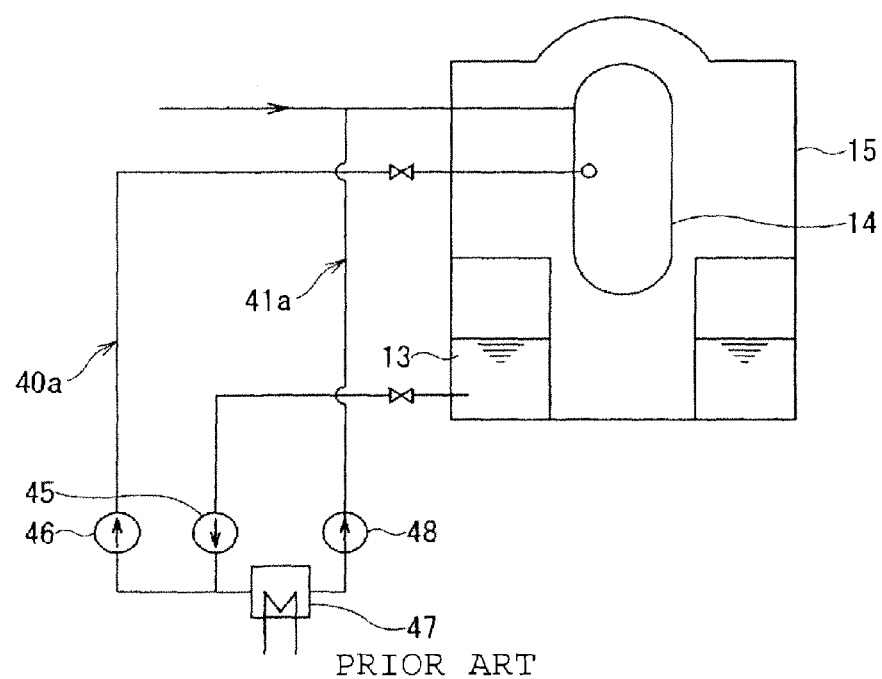
FIG. 11 is a drawing showing a configuration of the emergency core cooling system of the conventional BWR72.
Figure 12:
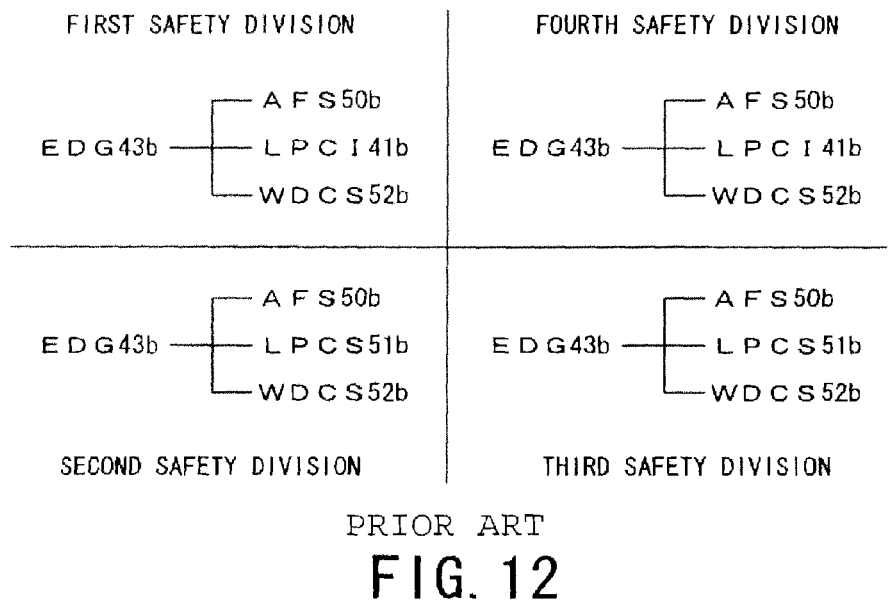
FIG. 12 is a division diagram showing an emergency core cooling system of a conventional BWR75.
Figure 13:
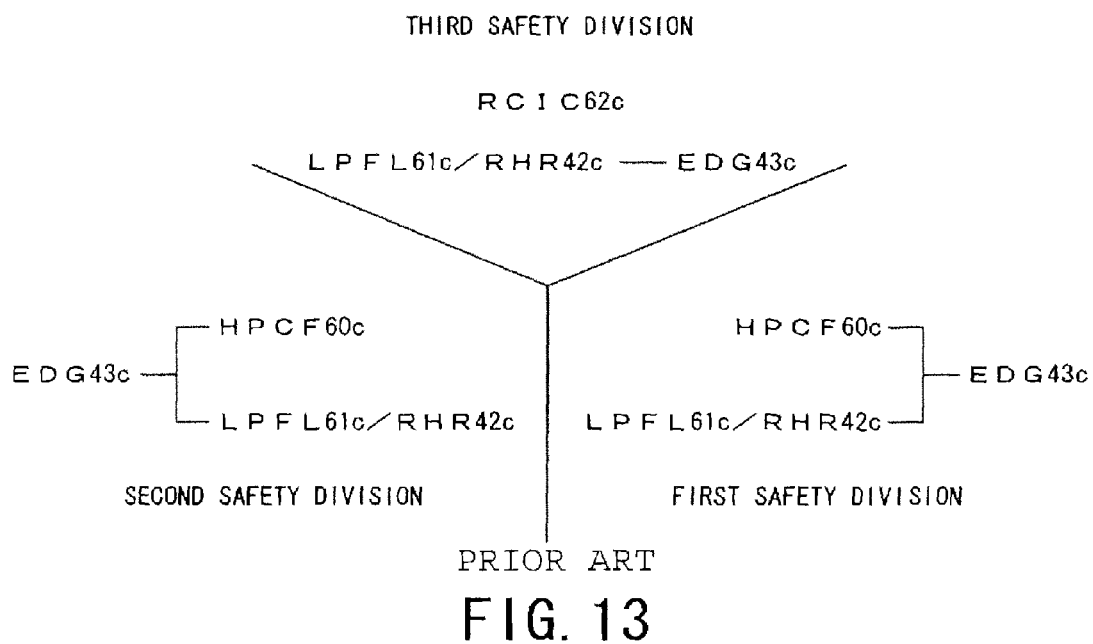
FIG. 13 is a division diagram showing an emergency core cooling system of a conventional ABWR.
Figure 14:
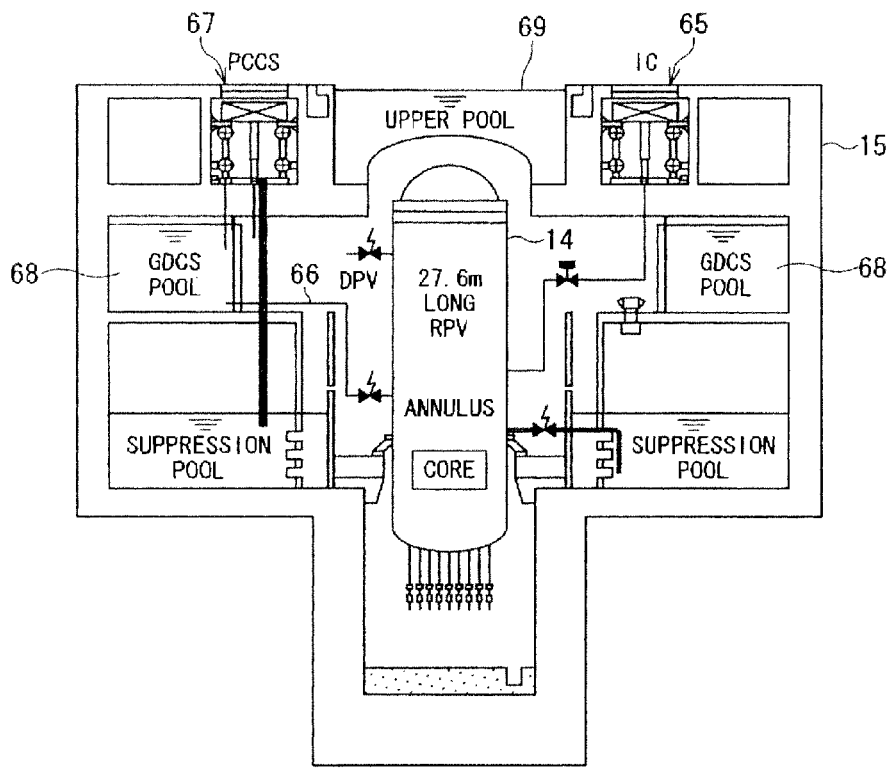
FIG. 14 is a drawing showing a configuration of an emergency core cooling system of a conventional ESBWR.
Figure 15:
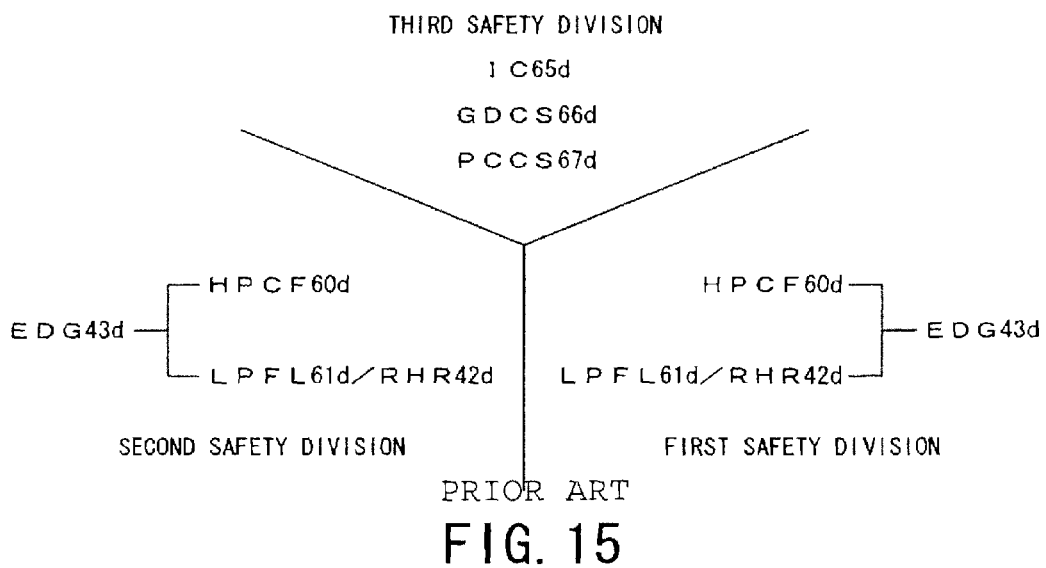
FIG. 15 is a division diagram showing an emergency core cooling system of a conventional TSBWR.

FIG. 9 is a division diagram showing the ECCS incorporated in a BWR. According to the fourth embodiment, to the emergency diesel generator (EDG) 4, a gas turbine generator 35*b* is further added for supplying the power to any one of the safety divisions for the active safety system by switching over a division to another. At least one gas turbine generator 35*b* is provided outside of the safety divisions for the active safety system, for example.

In the ECCS according to the fourth embodiment, by providing a circuit breaker 36 across a line between the gas turbine generator 35*b* and each safety division for the active safety system, the power supply line from the gas turbine generator 35*b* can be switched to the power supply bus of each dynamic active safety system.

Since the gas turbine generator 35*b* is shared with the whole safety divisions for the active safety system, the entire ECCS has six lines of the emergency power supply. Therefore, the diversity of the power supply can be ensured, and accordingly, the safety can be improved against the SBO during operation of the nuclear reactor power plant.

Thus, even if a severe natural phenomenon, such as a giant earthquake or a mega hurricane, is generated, a risk resulting in the reactor core damage can be extremely reduced.

This application claims priority from Japanese Patent Application 2007-125567, filed May 10, 2007, which is incorporated herein by reference in its entirety.

What is claimed is:

1. An emergency core cooling system provided for a boiling water reactor plant comprising:
    three safety divisions for an active safety system, each of said safety divisions including a high pressure core cooling system having no less than 100% of the injection capacity required for cooling a reactor core at a design basis accident, a low pressure core cooling system having no less than 100% of the injection capacity required for cooling the reactor core at the design basis accident, a residual heat removal system, which is commonly used as the low pressure core cooling system, having no less than 100% of a heat removal capacity required for cooling the reactor core and a containment vessel at the design basis accident, and an emergency power supply source for feeding electric power to the high pressure core cooling system, the low pressure core cooling system, and the residual heat removal system; and
    at least one safety division for a passive safety system including an isolation condenser that cools and safely shuts down the reactor core for no less than 8 hours without replenishing cooling water even when a fire in a first safety division for the active safety system, a single failure in a second safety division for the active safety system and online maintenance in a third safety division for the active safety system occur simultaneously,
    wherein the active safety system does not include a pre-stage booster pump of which failure can cause a loss of whole function of one safety division.

2. The system according to claim 1, wherein the emergency power supply source provided in each of the safety divisions for the active safety system includes at least one emergency diesel generator.

3. The system according to claim 2, wherein the emergency power supply source includes at least one auxiliary gas turbine generator in each of the safety divisions for the active safety system.

4. The system according to claim 2, wherein the emergency power supply source provided in each of the safety divisions for the active safety system is connected to at least one shared gas turbine generator, said shared gas turbine generator being equipped outside of the safety divisions for the active safety system and shared among the safety divisions for the active safety system.

5. The system according to claim 1, wherein the safety division for the passive safety system further includes a passive containment cooling system.

6. The system according to claim 5, wherein the safety division for the passive safety system further includes a gravity-driven core cooling system.

7. The system according to claim 1, wherein the low pressure core cooling system provided in each of the safety divisions for the active safety system further includes a containment spray system comprising a containment spray header, a containment spray header connecting pipe, and a containment spray injection valve for spraying cooling water into the containment vessel.

8. The system according to claim 1, wherein the residual heat removal system is provided independently of the low pressure core cooling system in each of the safety divisions for the active safety system, said residual heat removal system including a containment spray system comprising a containment spray header, a containment spray header connecting pipe, and a containment spray injection valve for spraying cooling water into the containment vessel.

9. A boiling water reactor plant comprising:
    a reactor pressure vessel containing a reactor core;
    a containment vessel containing the reactor pressure vessel;
    an emergency core cooling system having three safety divisions for an active safety system, each of said safety divisions for the active safety system including a high pressure core cooling system having no less than 100% of the injection capacity required for cooling the reactor core at a design basis accident, a low pressure core cooling system having no less than 100% of the injection capacity required for cooling the reactor core at the design basis accident, a residual heat removal system, which is commonly used as the low pressure core cooling system, having no less than 100% of a heat removal capacity required for cooling the reactor core and the containment vessel at the design basis accident, and an emergency power supply source for feeding electric power to the high pressure core cooling system, the low pressure core cooling system, and the residual heat removal system; and at least one safety division for a passive safety system including an isolation condenser that cools and safely shuts down the reactor core for no less than 8 hours without replenishing cooling water even when a fire in a first safety division for the active safety system, a single failure in a second safety division for the active safety system and online maintenance in a third safety division for the active safety system occur simultaneously, wherein the active safety system does not include a pre-stage booster pump of which failure can cause a loss of whole function of one safety division.

* * * * *